United States Patent
Elmes et al.

(10) Patent No.: US 8,773,077 B1
(45) Date of Patent: Jul. 8, 2014

(54) CONTROLLERS FOR BATTERY CHARGERS AND BATTERY CHARGERS THEREFROM

(75) Inventors: John Elmes, Orlando, FL (US); Rene Kersten, Orlando, FL (US); Michael Pepper, Oviedo, FL (US)

(73) Assignees: University of Central Florida Research Foundation, Inc., Orlando, FL (US); Advanced Power Electronics Corporation (APECOR Corp.), Orlando, FL (US)

( * ) Notice: Subject to any disclaimer, the term of this patent is extended or adjusted under 35 U.S.C. 154(b) by 773 days.

(21) Appl. No.: 13/041,164

(22) Filed: Mar. 4, 2011

Related U.S. Application Data

(60) Provisional application No. 61/311,094, filed on Mar. 5, 2010.

(51) Int. Cl.
- *H02J 7/04* (2006.01)
- *H02J 7/00* (2006.01)
- *H02J 7/02* (2006.01)

(52) U.S. Cl.
CPC ............... *H02J 7/022* (2013.01); *H02J 7/0093* (2013.01); *H02J 7/91* (2013.01); *H02J 2007/0059* (2013.01)
USPC ............ 320/145; 320/128; 320/140; 320/141

(58) Field of Classification Search
CPC ....... H02J 7/022; H02J 7/0093; H02J 7/0091; H02J 2007/0059
USPC .......................... 320/128, 140, 141, 144, 145
See application file for complete search history.

(56) References Cited

U.S. PATENT DOCUMENTS

| | | | | |
|---|---|---|---|---|
| 4,647,787 A * | 3/1987 | Pommer, II | .................. | 379/413 |
| 5,530,335 A | 6/1996 | Decker et al. | | |
| 5,642,027 A * | 6/1997 | Windes et al. | ................ | 320/166 |
| 5,642,029 A * | 6/1997 | Seragnoli | ....................... | 320/163 |
| 6,184,659 B1 * | 2/2001 | Darmawaskita | .............. | 320/139 |
| 6,690,590 B2 | 2/2004 | Stamenic et al. | | |
| 6,984,970 B2 | 1/2006 | Capel | | |
| 7,158,395 B2 | 1/2007 | Deng et al. | | |
| 8,013,472 B2 * | 9/2011 | Adest et al. | ..................... | 307/77 |
| 8,629,658 B1 * | 1/2014 | Celani | .......................... | 320/140 |
| 2006/0017327 A1 * | 1/2006 | Siri et al. | ........................ | 307/43 |
| 2008/0111517 A1 | 5/2008 | Pfeifer et al. | | |
| 2008/0150484 A1 | 6/2008 | Kimball et al. | | |
| 2008/0258675 A1 | 10/2008 | Caldwell et al. | | |
| 2009/0319975 A1 * | 12/2009 | Huynh et al. | ................... | 716/10 |

* cited by examiner

*Primary Examiner* — M'Baye Diao
(74) *Attorney, Agent, or Firm* — Jetter & Associates, P.A.

(57) ABSTRACT

A controller for a battery charger that includes a power converter has parametric sensors for providing a sensed Vin signal, a sensed Vout signal and a sensed Iout signal. A battery current regulator (BCR) is coupled to receive the sensed Iout signal and an Iout reference, and outputs a first duty cycle control signal. An input voltage regulator (IVR) receives the sensed Vin signal and a Vin reference. The IVR provides a second duty cycle control signal. A processor receives the sensed Iout signal and utilizes a Maximum Power Point Tracking (MPPT) algorithm, and provides the Vin reference to the IVR. A selection block forwards one of the first and second duty cycle control signals as a duty cycle control signal to the power converter. Dynamic switching between the first and second duty cycle control signals maximizes the power delivered to the battery.

20 Claims, 7 Drawing Sheets

System 100

System 100

200

MPPT Mode

CONTROLLERS FOR BATTERY CHARGERS AND BATTERY CHARGERS THEREFROM

CROSS REFERENCE TO RELATED APPLICATIONS

This application claims the benefit of Provisional Application Ser. No. 61/311,094 entitled "BATTERY CHARGER HAVING POWER CONVERTER CONTROLLED BY SELECTION OF DUTY CYCLE CONTROL SIGNALS THAT ARE BASED ON SENSED PARAMETERS", filed Mar. 5, 2010, which is herein incorporated by reference in its entirety.

FEDERAL FUNDING

The U.S. Govt. has rights to certain embodiments disclosed herein based on NASA SBIR Contract No. NNC08CA20C.

FIELD

Disclosed embodiments relate to battery chargers.

BACKGROUND

A photovoltaic solar panel is ordinarily arranged as an array of cells (referred to as a solar array or solar panel) that directly converts solar energy (sunlight) into electrical energy. The electrical energy produced by the solar array can be extracted over time and used in the form of electric power, such as to recharge batteries. Power-Voltage (Power extracted versus Voltage; P-V) characteristics of solar cells are known to exhibit an IV droop characteristics that causes the output power sourced to change nonlinearly with the current drawn. Furthermore, there is a significant variation in the characteristics of the P-V curve for different solar array types.

Solar panels designed for charging a 12v battery or other batteries generate the most power when the output voltage is approximately 17v, this is known as the maximum power point (MPP). However, when a battery is directly connected to the solar panel, the loading due to the battery pulls the solar panel operating voltage down to the battery voltage, which is usually lower than the MPP. By using a DC/DC converter to connect the solar panel to the battery, the solar panel is allowed to run at a higher voltage so that its maximum power output is higher than when the solar panel is connected directly to the battery.

Solar battery chargers are known and some utilize a form of MPP tracker (MPPT) to maximize charging power. Such arrangements generally include a DC-DC power converter that is under control by a digital signal processor (DSP) that controls the duty cycle of the power converter in an attempt to maximize the power delivered to the battery or batteries being charged.

SUMMARY

Disclosed embodiments include controllers for battery chargers that dynamically select between duty cycle control signals that are generated based on sensed power converter parameters for controlling the duty cycle of power converters, and battery chargers therefrom. Dynamic selection of the duty cycle by disclosed controllers maximizes the power delivered to the battery or batteries being charged.

In one disclosed embodiment a controller block for a battery charger including a power converter comprises a plurality of parametric sensors for providing a plurality of sensed parameters provided by the power converter while the power converter is connected between a power source and at least one battery for charging at least one battery. The sensed parameters include a sensed Vin signal, a sensed Vout signal and a sensed Iout signal. A battery current regulator (BCR) is coupled to receive the sensed Iout signal and an Iout reference, wherein the BCR outputs a first duty cycle control signal.

An input voltage regulator (IVR) receives the sensed Vin signal and a Vin reference. The IVR provides a second duty cycle control signal. A processor is coupled to receive the sensed Iout signal. The processor utilizes a Maximum Power Point Tracking (MPPT) algorithm and provides the Vin reference to the IVR. A selection block is coupled to receive the first and second duty cycle control signals. The selection block forwards one of the first and second duty cycle control signals as a duty cycle control signal to the power converter, and in operation the selection block switches between the first and second duty cycle control signals to maximize the power delivered to the battery or batteries being charged.

DETAILED DESCRIPTION

Figure 1A:
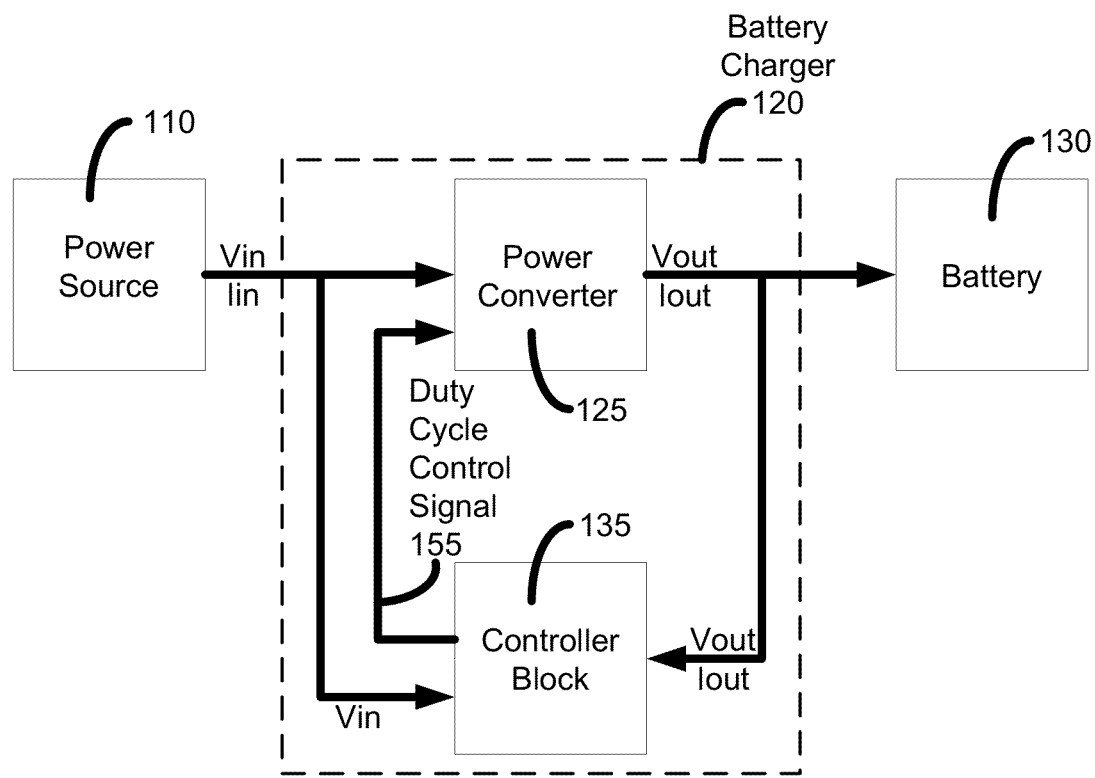
FIG. 1A is a simplified block diagram of an example charging system showing a power source coupled to a battery charged by a battery charger according to a disclosed embodiment that includes a power converter and a controller block that generates first and second duty cycle control signals, selects between the duty cycle control signals, and applies the selected duty cycle control signal to the power converter.

Disclosed embodiments are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments.

One having ordinary skill in the relevant art, however, will readily recognize that the disclosed embodiments can be practiced without one or more of the specific details or with other methods. In other instances, well-known structures or operations are not shown in detail to avoid obscuring the disclosed embodiments. The disclosed embodiments are not limited by the illustrated ordering of acts or events, as some acts may occur in different orders and/or concurrently with other acts or events. Furthermore, not all illustrated acts or events are required to implement a methodology in accordance with disclosed embodiments.

Disclosed embodiments describe battery chargers that include a charging algorithm that selects between duty cycle control signals generated by separate regulators, wherein the duty cycle control signals are based on at least a plurality of different sensed power converter parameters. A control scheme is also described that operates without the need for an input current sensor. An MPPT algorithm is also described that has a unique control feature that avoids input voltage collapse. Furthermore, a control algorithm is described, which enables the charging of multiple batteries simultaneously while only requiring a single power converter, such as a single DC-DC power converter.

FIG. 1A is a simplified block diagram of an example charging system 100 including a power source (e.g., solar panel) 110 coupled to a battery 130 that is charged by a battery charger 120 according to a disclosed embodiment. Battery charger 120 comprises a power converter 125 and a controller block 135 that controls the power converter 125 by providing a duty cycle control signal 155 for the power converter 125 that as described below is based on selection between a first duty cycle and a second duty cycle control signal that are each based on measured parameters. One duty cycle control signal is generally based on a MPPT algorithm while the other duty cycle control signal is generally based on a non-MPPT algorithm, such as battery current regulation which can also be referred to as battery charge control (BCC). Although the power source 110 is generally described herein as being a solar source, the power source can be other types of power sources, such as a DC battery (e.g., a 24 volt DC battery).

Power source 110 provides input power at an input voltage (Vin) and input current (Iin), and power converter 125 provides an output voltage (Vout) and a battery current (Iout) to charge the battery 130. The duty cycle is commanded by the controller block 135 that controls the power converter 125, to control Vin, Iout, and Vout. The regulator components of controller block 135 are generally realized using one or more digital controllers.

In one embodiment the power converter 125 comprises a synchronously switched DC-DC converter with reverse polarity protection. In other embodiments, the power converter 125 may also generally be any converter suitable for charging connected batteries. In solar applications, since the solar panel voltage is assumed to be greater than the full battery voltage for the battery 130 being charged, under normal operation, the power converter 125 is embodied as a buck converter which provides the necessary voltage step down to the desired voltage (e.g., 12 volts) for the battery 130 being charged.

Figure 1B:
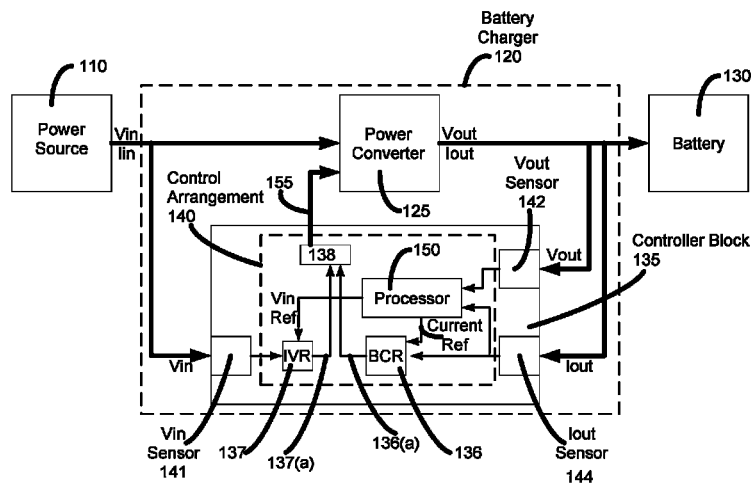
FIG. 1B is a block diagram of the charging system shown in FIG. 1A that shows example features for the controller block, according to a disclosed embodiment.

FIG. 1B is a block diagram of a charging system 100 that discloses example features for controller block 135 shown in FIG. 1A, according to a disclosed embodiment. Controller block 135 is shown including a control arrangement 140 that may comprise a processor 150 such as a digital signal processor (DSP) that provides a duty cycle control signal 155 for the power converter 125. The controller block 135 also comprises a plurality of different parametric sensors for providing a plurality of different measured parameters output by the power converter 125 comprising a Vin sensor 141, a Vout sensor 142 and an Iout sensor 144. Although not shown in FIG. 1B, system 100 can also include other parametric sensors such as a temperature sensor, and the algorithms run by processor 150 can include temperature considerations.

Control arrangement 140 generally comprises at least two regulators, which are generally both closed loop controllers. A battery current regulator (BCR) 136 is shown for receiving the Iout signal and an Iout reference, wherein the BCR 136 outputs a non-MPPT duty cycle control signal 136(a), which if selected by the Minimum Function 138, controls the current provided by the power converter 125 to equal an Iout reference. As described below, the Iout reference can be generated by an output voltage regulator (OVR) that is coupled to receive Vout (see FIG. 3 described below). Controller block 135 is also shown comprising a Vin regulator (IVR) 137 for receiving the sensed Vin signal from Vin sensor 141 and a Vin reference, wherein the IVR 137 provides a MPPT duty cycle control signal 137(a), which if selected by the Minimum Function 138 controls the input voltage of the power converter 125 to equal the Vin reference. A processor 150 (e.g., DSP) is coupled to receive the sensed Vin, Iout, and Vout signals from Vin sensor 141, Iout sensor 144, and Vout sensor 142, respectively, which each generally comprise analog sensing circuitry.

The processor 150 can utilize a MPPT algorithm to provide the Vin reference shown coupled to the IVR 137 based on Vin, Vout, Iout, and optionally the battery type, battery voltage and/or the temperature. Minimum Function block 138 is coupled to receive the MPPT duty cycle control signal 137(a) provided by ICR 137 and the non-MPPT duty cycle control signal 136(a) provided by BCR 136. Processor 150 runs a control algorithm capable of MPPT, which can dynamically vary the Vin reference for the IVR 137 control loop, thus controlling the electrical loading of the power source 110, so as to maximize the power from the power source 110, such as the harvested power in the case the power source comprises a solar panel.

In operation, Vin sensor 141 in controller block 135 block senses Vin such provided by the power source 110 (e.g., a solar panel), the Vout sensor 142 senses Vout from the power converter 125, the Iout sensor 144 senses the battery current (Iout), and optionally the temperature and/or the battery voltage is also sensed (See description of the output voltage regulator (OVR) below with respect to in FIG. 3). These sensed parameters are utilized by processor 150 to calculate the appropriate input voltage reference Vin_ref which is coupled to the IVR controller 137, which is operable to control the duty cycle control signal 155 for the power converter 125 for maximum power transfer. The selection performed by Minimum Function 138 is used as the duty cycle control signal 155 that is coupled to the power converter 125, where the selection generally comprises selecting the lower in magnitude of the duty cycle control signals 136(a) and 137(a).

Figure 2:
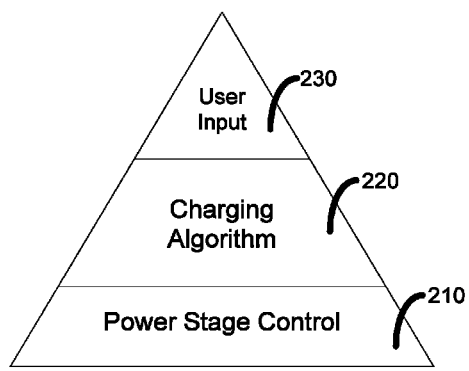
FIG. 2 is a depiction of an example control structure layered into three main sections, according to a disclosed embodiment.

Now referring to FIG. 2, an example control structure 200 is shown layered into three main sections/levels. The first level is the power stage control 210 in which a controller block 135, such as based on a DSP, that directly affects the duty cycle of the power converter 125 is used to run the system's main control loops. The second level can be considered a charging algorithm 220 that can accept user inputs 230. These user inputs 230 can be as simple as connecting a power source 110, such as a battery or solar panel, to the battery charger 120, or more complex user' inputs 230 such as receiving run and stop commands from a computer user interface through a suitable communication medium. These user inputs 230 can be seen as the third level of control provided by control structure.

The implementation of the lower two control levels 210 and 220 in the controller block 135, such as based on a DSP, can utilize periodic and free running loops. How often the periodic loops run can depend on the bandwidth requirements of functions in that loop. Functions that do not require timing can be run asynchronously. The power stage control layer 210 generally has the highest demand on bandwidth. Therefore, the loop that contains the power stage functions will generally be the fastest. This power stage control layer can run the MPPT algorithm, include IVR 137, include an OVR (see FIG. 3 for the OVR), the BCR 136, and also provide fault checks. The final control variable that is output by the power stage control layer 210 to the power converter 125 is the duty cycle control signal 155 for the power converter 125, as well as the control signals for other circuitry, such as for biasing the gates of the example MOSFET switches in the battery connection circuit 320 shown in FIG. 4 as described below.

Figure 3:
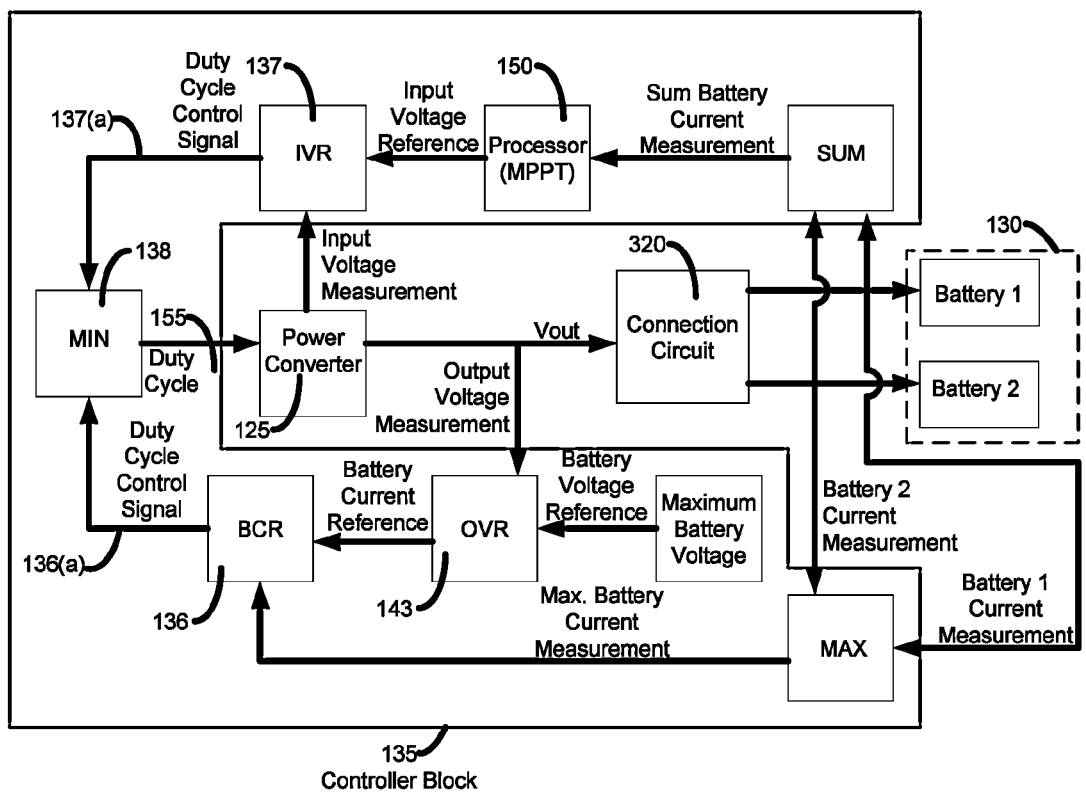
FIG. 3 is a block diagram of an example controller block connected to a power converter, according to a disclosed embodiment.

FIG. 3 is a block diagram of an example charging system 300 including an example controller block 135 that provides power stage control that is connected to a power converter 125 shown charging two batteries (battery 1 and battery 2), according to a disclosed embodiment. Although no power source is shown in FIG. 3, the output of a power source, such as power source 110 described above, is coupled to an input of the power converter 125. Parametric sensors 141, 142 and 144 shown in FIGS. 1A-B, are also not shown in FIG. 3 for clarity. As can be seen from FIG. 3, the duty cycle control signal 155 can come from the IVR 137 (MPPT duty cycle control signal 137(a)) or the BCR 136 (non-MPPT duty cycle control signal 136(a)) depending on parameters including the sensed parameters and the control objective.

The IVR 137 can comprise controllers including a digital PID (proportional-integral-derivative) controller to regulate Vin from the power source that is applied to the power converter 125. The Vin measurement is typically sampled via the ADC (analog-to-digital converter) of the DSP and is used to change the MPPT duty cycle control signal 137(a) in a way that regulates the Vin to the Vin reference provided by processor 150.

In the case the power source is a solar panel, because of the characteristics of the solar panel, a higher duty cycle typically corresponds to a lower input voltage. Accordingly, for solar applications the IVR 137 functions as a positive feedback regulator. Once the IVR 137 has reached steady state its MPPT duty cycle control signal 137(a) output will be in one of the three possible states; saturated at the maximum duty cycle, saturated at the minimum duty cycle, or locked on to the duty cycle value which yields the result that the Vin reference and Vin measurement are equal. It should be noted that if a constant voltage power source 110 is used, such as a battery or power supply, changing the duty cycle will not have a significant effect on Vin and therefore the IVR 137 will saturate either high or low depending on the Vin reference and the Vin measurement.

The Vin reference can be commanded by processor 150 embodied as a DSP running a MPPT algorithm as shown in FIG. 3. One MPPT algorithm that can be utilized is the perturb-and-observe (P&O) method. However, other algorithms can be used. As known in the art, MPPT algorithms change the Vin reference and observe if that change increases or decreases the power level delivered. If the delivered power level increases, the MPPT algorithm continues changing the input voltage reference in the same direction in the next iteration. If the power level goes down, the direction of the change in the Vin reference is reversed.

Typically the power level measured and used in the MPPT algorithm by processor 150 is the power coming from the power source 110 (e.g., a solar panel) which can be calculated by multiplying the sensed Vin and sensed Iin signals. However, in one embodiment the relative change in power coming from the power source 110 is approximated by the battery output current (Iout) or sum of the battery currents when two or more batteries are charged, such as shown in FIG. 3. This is generally a valid approximation since the MPPT algorithm changes the Vin reference at a frequency that is very high compared to the battery voltage change rate so that it can be assumed that the battery voltage is constant during this time. Also, the output power to the battery(ies) is equal to the input power provided by the power source 110 minus the losses from the power converter 125. By using this method, the need for an Iin sensor is eliminated which increases the system efficiency, and helps keep reduce the cost of battery chargers disclosed herein.

As noted above, besides IVR 137, the duty cycle control signal 155 for the power converter 125 can also come from the non-MPPT duty cycle control signal 136(a) provided by BCR 136 as shown in FIG. 3. The BCR's 136 control loop can modulate the duty cycle to regulate the maximum charging current in any of the multiple batteries to correspond with the maximum charge current reference Imax commanded to the BCR controller. The BCR controller architecture can generally be selected from any number of known controllers, with the PID controller being one embodiment. For example, the BCR 136 can comprise a digital PID controller that can be used to regulate the greater of the two battery currents in the case of two or more batteries being charged. This can be done by sending the maximum measured current to the BCR 136 as the measured current. Since an increase in duty cycle generally causes an increase in the battery current, the BCR 136 in this mode functions as a negative feedback regulator.

Once the BCR 136 has reached steady state its non-MPPT duty cycle control signal output 136(a) will generally be in one of the three possible states; saturated at the maximum duty cycle, saturated at the minimum duty cycle, or locked on to the duty cycle value which yields the result that the battery current reference and measurement are equal. It should be noted that if the power source 110 is embodied as a solar panel that does not provide sufficient power to be able to regulate the battery current to the reference current, the duty cycle of the BCR 136 will saturate at the maximum duty cycle, as it is will not be able to achieve the referenced current command.

The OVR control loop (OVR) 143 can modulate the BCR Imax command reference so as to regulate Vout to the commanded value Vout_ref, and hence, the voltage of any of the batteries 130 that are connected through connection circuit 320 which can be embodied as a bidirectional blocking switch. The controller architecture can be any number of known typical controllers, with the PID controller being one embodiment. In one embodiment, OVR 143 is embodied as a negative feedback, digital PID controller. The output of the OVR 143 shown in FIG. 3 is the commanded battery current reference. With proper design of both the OVR 143 and the BCR 136, a stable method for regulating the output voltage is implemented by changing the current going to the batteries 130. The steady state output of the OVR 143 can also occupy three states; saturated high, saturated low, or the proper battery current reference which yields a regulated output voltage.

The Minimum Function block 138 which provides duty cycle selection by selecting which duty cycle value (from duty cycle signals 136(*a*) and 137(*a*)) is used as the duty cycle control signal 155 to control the power regulator 125. A reason for using a Minimum Function 138 to select the duty cycle can be appreciated by analyzing an example provided below for charging a Li-ion battery. Both connection switches in connection circuit 320 are initialized off. The Vin reference is initialized at the minimum voltage allowable for normal operation and the output of the IVR 137 is initialized to the maximum duty cycle. The OVR 143 output voltage reference is initialized to the measured output voltage seen just before the power converter stage 125 is enabled. The battery current reference output of the OVR 143 is initialized to zero. Since the battery current reference is coupled to the input of the BCR 136, the BCR reference is initialized to zero. The output of the BCR is initialized to the duty cycle calculated to maintain the input to output voltage ratio seen just before the power converter 125 is enabled. All of this initialization is part of the soft start and is used to help reduce or eliminate voltage and current spikes at start up, which should lengthen the lifetime of the components of the power converter 125 and the battery(ies) 130 connected thereto for charging.

Once the power converter 125 is enabled, the IVR 137 tries to regulate Vin to a value lower than the open circuit voltage of the power source (e.g., solar panel) 110, causing its output duty cycle to stay saturated to a high value. This in turn causes the IVR 137 to lose at the Minimum Function 138 during the soft start, so that the duty cycle control signal 155 is set by duty cycle non-MPPT duty cycle control signal 136(*a*). The output voltage reference is slowly ramped up to the lower of the two battery voltages. Once this happens the Vout reference does not change until the corresponding connection switch is enabled, allowing the power converter 125 to charge the first battery.

Once this happens, the Vout reference continues to ramp up to the acceptance voltage of the battery 130, causing the battery current (Iout) to increase. During this time a number of different things can occur. If there is sufficient power from the power source (e.g. solar panel) 110 the OVR 143 could become saturated at its upper limit. This, in most cases, is set to the maximum current reference allowable to safely charge the battery 130. During this case, the battery current (Iout) is regulated and the Vout will slowly increase as the battery(ies) 130 is charged.

If the battery 130 is already close to being fully charged, the OVR 143 will not saturate and some amount of current will go to the battery in order to regulate the output voltage at the acceptance voltage. If the power source (e.g. solar panel) 110 does not have enough power to regulate either the output voltage or the battery current then the BCR 136 will continue to increase the duty cycle of non-MPPT duty cycle control signal 136(*a*) trying to achieve regulation for either itself or for the OVR 143. Once the power point passes the maximum power point an increase in the duty cycle will produce the opposite of the desired result. For example, increasing the duty cycle will decrease the battery current instead for increasing it when the operating power point is left of the maximum power point.

Because of this the BCR 136 will generally quickly saturate to the maximum duty cycle. This causes Vin to quickly collapse. Once the input voltage reaches the minimum voltage allowable for safe operation, the IVR MPPT duty cycle control signal 137(*a*) begins to come out of saturation. At the same time the duty cycle control signal 155 output provided by Minimum Function 138 is clamped to its current value and not allowed to go higher. By actively clamping the duty cycle control signal 155 to a maximum value corresponding to the duty cycle at the moment the input voltage Vin collapsed to the predetermined minimum allowable input voltage, the system is generally assured that the input voltage can fall no further, protecting the system from unwanted input undervoltage conditions. Once the MPPT duty cycle output 137(*a*) of the IVR 137 becomes lower than the non-MPPT duty cycle output 136(*a*) of the BCR 136, the MPPT duty cycle output 137(*a*) wins the Minimum Function's 138 selection and uses the MPPT duty cycle control signal 137(*a*) that results in MPPT control of the duty cycle of the power converter 125. However, this generally does not happen until MPPT duty cycle output 137(*a*) becomes lower in magnitude as compared to the clamped non-MPPT duty cycle value 136(*a*) provided by BCR 136.

This additional function disclosed herein prevents the BCR regulator 136 and IVR regulator 137 from commanding any duty cycle control signal 155 that could cause Vin to go below the minimum operating voltage without breaking its continuous operation. Once the IVR 137 wins the Minimum Function 138, the MPPT algorithm is enabled and starts to hunt for the maximum power. After it finds the maximum power it hovers around it even if that point changes (i.e. the available panel power changes). Once the IVR 137 looses the Minimum Function 138 (i.e. to the BCR 136) the MPPT is disabled and reset. The IVR voltage reference is also reset and the BCR 136 and the OVR 143 regulates the output.

Faults can be checked in the fast loop. If there are no faults, the power converter 125 can be permitted to run in the manner described above. However, if a fault is detected it is first latched and can then be used to force the power converter 125 into standby. Standby forces the duty cycle control signal 155 to zero, disconnects the connection switches, and resets all of the regulators 136, 137 and 143. Once the fault condition is cleared the power converter 125 can be permitted to run again.

Figure 4:
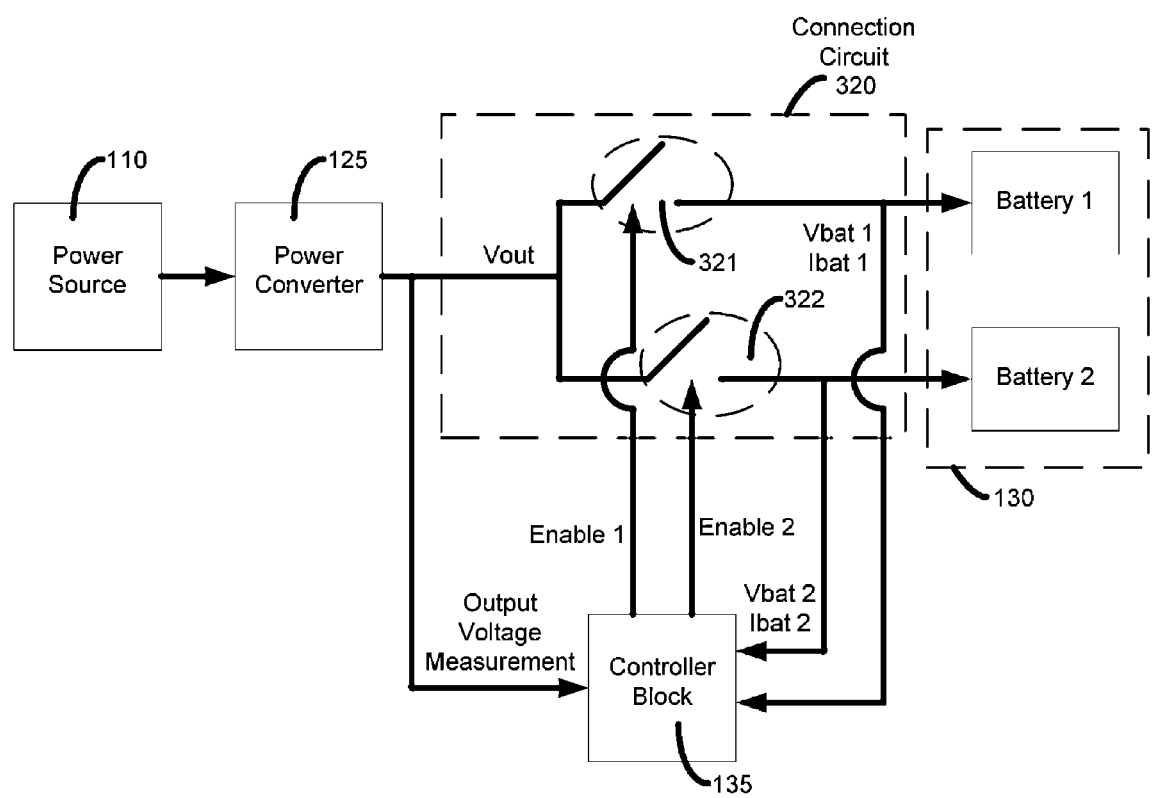
FIG. 4 depicts a simplified example connection circuit interposed between a power converter and batteries, according to a disclosed embodiment.

FIG. 4 depicts a simplified example connection circuit 320 interposed between a power converter 125 and batteries 130, according to a disclosed embodiment. Connection circuit 320 is shown comprising of a plurality of bidirectional controlled semiconductor switches 321 and 322, which can be enabled and disabled by control signals shown as enable 1 and 2 provided by controller block 135, so as to allow or disallow current to flow between the output of the battery charger and each individual battery (Battery 1 and Battery 2). The state of the bidirectional blocking switches 321 and 322 can be based on proper charge algorithms using analog current, voltage, and temperature (optional) sensing.

Figure 5:
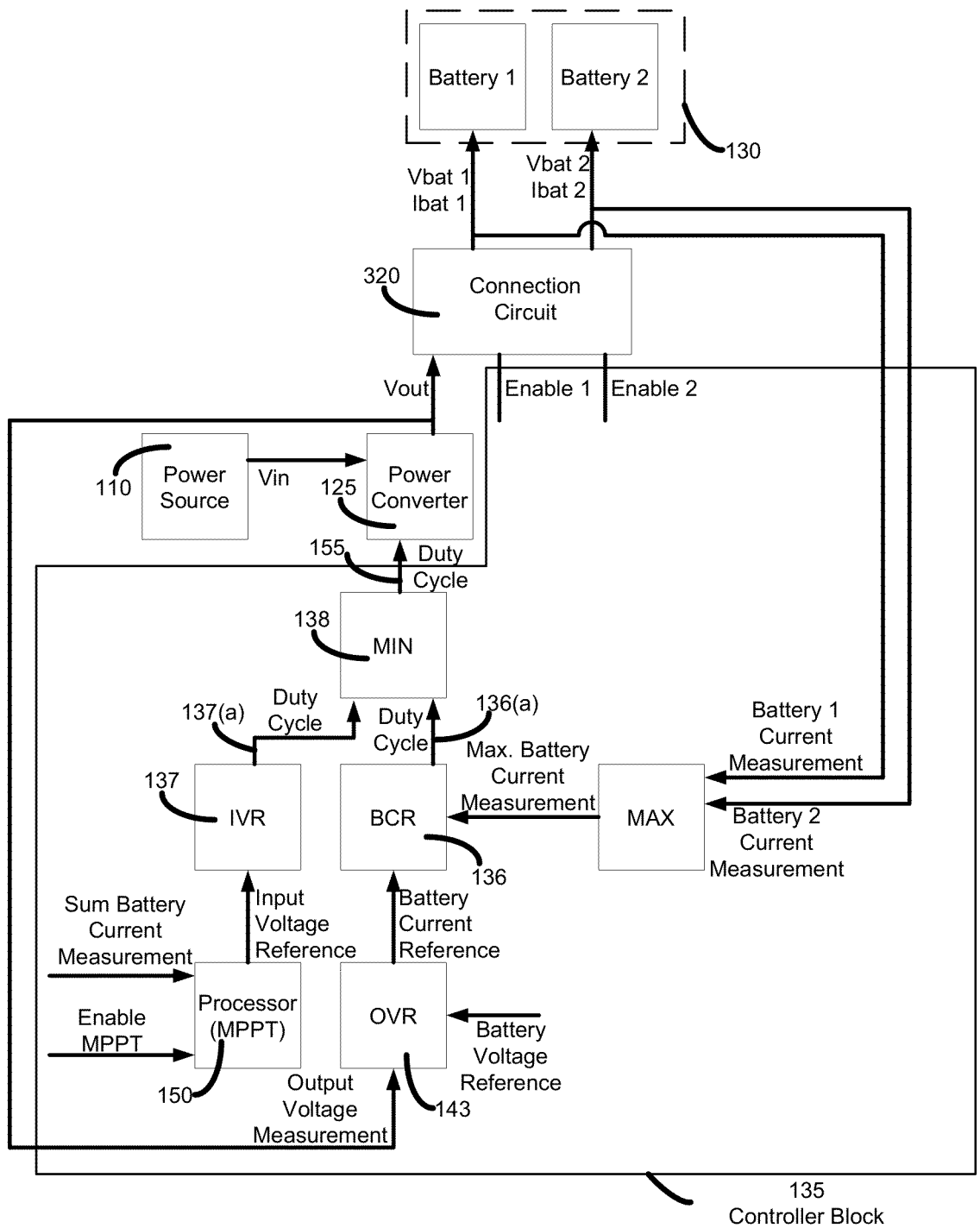
FIG. 5 is a block diagram of an example controller block connected to a power converter, with a power source connected to the power converter, according to another disclosed embodiment.

FIG. 5 is a block diagram of an example controller block 135 connected to a power converter 125, with a power source 110 connected to the power converter, according to another disclosed embodiment. Regarding the charging algorithm, the charging algorithm can utilize the power stage control structure described above. By passing a set of parameters to the power stage control, disclosed power converters 125 are generally able to operate safely as described above. Then by changing these parameters, different charge algorithms can be realized. These parameters include a Vout reference, Vout voltage saturation point (maximum charging current), connection switch overrides, and controller gains.

In solar source embodiments, once the solar panel voltage rises above the minimum operation voltage, the charging algorithm can initialize the power converter 125 to standby. The algorithm can then check to see if there is a proper voltage on the terminals of the battery 130 being charged. If the connection switches in connection circuit 320 are initialized off, allowing the voltage of the first battery, of the second battery (if present) as well as the output voltage to be different from each other. The charge algorithm can wait for the voltage of both batteries to fall within an acceptable range before it recognizes the batteries as appropriate and connects to them. Once connected, the charge algorithm can load the proper values to the power converter and enables the power converter. If a fault occurs, the charge algorithm will reset it and re-enable the power stage. If there is no fault the charge algorithm will commence a soft-start, by slowing ramping the output voltage of the power converter till the voltage is equal to that of the battery. The algorithm will advance to the charging phase once the power converter has reported that the soft start has finished.

The next stage of charging is a monitoring stage but could also still affect the power stage parameters if needed. For example, when charging lithium-ion (Li-ion) batteries, each battery current can be monitored and if it goes below the minimum value, the connection switch can be disconnected. Once the end of charge is detected in this state, the charge algorithm is advanced to the next stage of charging. In the final stage the charging algorithm is simply waiting for the battery to be disconnected by the user. When this happens the charging algorithm is reset and starts over.

As described above relative to FIG. 2, a user input 230 can be provided. The user input control 230 can comprise three main operations which involve the user connecting the power source 110 to the input of the battery charger 120, connecting the load (i.e. battery) to the output of the battery charger 120 and a communication device from the battery charger to the user. The operation of the user connecting a power source 110 to the input of the battery charger 120 allows power to be supplied to the battery charger 120. The power source 110 then powers up the battery charger 120 and enables the other control structures to turn on. A power source 120 that can be used is a foldable solar panel, in addition to other DC voltage sources within the proper operational range of the charger.

Most DC (direct current) power sources, as long as their voltage is in the proper range, such as 20V-60V, can work with disclosed battery chargers as well, such as an automobile battery. The other operation of connecting the load to the battery charger enables the unit to start providing power to the load if the power source is already connected to the input. The load can be a battery where the battery charger has the ability to charge multiple chemistries. The unit may be capable of supplying a constant DC power to some load similar to the power supply of portable electronics, such as a laptop computer. One method of communication from the unit to the user is an LED (light emitting diode) interface. The LEDs can light up when power has been applied and indicate the state of charge and show if an error has occurred. This communication facilitates optimum use of the battery charger unit by notifying the user as to the battery state of charge, and the current charge rate. Such information can enable the user to quickly charge several batteries to a nearly full level, by disconnecting the batteries early, and charging a more depleted battery, instead of waiting for the final charge stages of the charge algorithm. While this action is not optimal for the lifetime and longevity of the batteries, in some instances, the use may value the ability to harvest as much energy as possible in a short amount of time over the useful lifetime of the batteries.

Some additional embodiments and/or additional disclosure is described below, which are presented under the categories control and circuitry.

Control

1) A function which modifies the controller output of the OVR 143, BCR 136, and IVR 137 when these controllers come out of upper saturation. Upper saturation occurs when the controller reaches the maximum allowable controller output and is then clamped to this value. The controller usually loses the minimum function when it is in upper saturation. As the controller comes out of saturation, it is first loaded with the current value of its controlling parameter. The controlling parameter for BCR and IVR is the duty cycle since the output of the controller is duty cycle. Since the steady state output value of any PID controller is stored in the integrator portion of the controller, this is portion of the controller which is modified when the controller comes out of upper saturation. As the controller comes out of upper saturation the current duty cycle being used by the converter is loaded. The same processes happens to OVR, using its control parameter output current. The result is smoother transitions between the control loops.

2) A Maximum Charge Current (MCC) function, which defines the variable I_max_charge, which is used as the upper saturation limit of the OVR 143. The value of I_max_charge is defined as the Minimum function of the maximum allowable charge current based on the battery charge algorithm (I_batt_max), and the extreme temperature current limit (I_limit_temp) as defined by the function Temperature Current Limiter.

3) A Temperature Current Limiter (TCL) function, which uses linear equations to gradually reduce the maximum current capability of the system, based on the high temperature and low temperature limits of the system. This function generates the variable I_limit_temp, which feeds into the MCC function. I_limit_temp is can be calculated based on pre-determined temperature limits for the system, and a pre-defined linear derating slope, which will gradually reduce the allowable system current as the temperature rises too high, or falls too low.

4) A Minimum Input Voltage (MIV) function, which clamps the input voltage to a minimum input voltage set by the Minimum Input Equation (MIE). This function can be realized by pausing the actual duty cycle whenever the input voltage drops below the value determined by MIE. After this the duty cycle can only be updated if the commanded duty cycle is smaller than the paused duty cycle or if the input voltage increases above the value determined by MIE. This function prevents a complete input voltage collapse and enables the control circuitry to always being powered by the photovoltaic power source for a more efficient charging operation.

5) A Minimum Input Equation (MIE) can be used to calculate the minimum input voltage needed to operate the converter and all of its auxiliary components. This equation can be dependent on any parameter that requires a minimum input voltage to operate. In this embodiment the equation divides the output voltage by a minimum desirable duty ratio.

6) A Maximum Power Point Tracking (MPPT) algorithm capable of modifying the IVR control reference IVR_ref of continuously so as to maximize the output current, which is also capable of being enabled or disabled.
   a) A disabled condition, which will reset the IVR control reference IVR_ref to the minimum operational input voltage Vin_min, as commanded by the Minimum Input Voltage (MIV).
   b) An enabled condition, which actively varies the IVR control reference IVR_ref to achieve a maximum charging current. This algorithm can be achieved in many ways; it is currently embodied as the Perturb-and-Observe (PAO), or hill-climbing-algorithm. The algorithm will vary the IVR_ref value slightly, observe the change in output current, and either continue to change the value of IVR_ref in the last direction if the current increased, or increment in the opposite direction if the current decreased.

Circuitry

7) An electronic circuit comprising a plurality of bidirectional controlled semiconductor switches, such as connection circuit 320 shown in FIG. 3, which can be enabled and disabled by the digital controller, so as to allow or disallow current to flow between the output of the switch mode power supply (SMPS) and each individual battery.

8) Analog sensing and conditioning circuit which can transform the battery charger voltage, current, and temperature information to voltage levels to be read by the Analog to Digital converter (ADC) of the digital controller, so as to control the overall control and charging strategies.

9) A Battery Connect & Disconnect function, which senses the conditioned battery voltage and battery current values from each battery, and can either enable or disable the bidirectional blocking switches as follows:
   a) The connection switches are enabled when the output voltage of the SMPS is greater than or equal to the voltage of the respective battery.
   b) The connection switches are disabled when the sensed current of the respective battery is less than or equal to 0A.
   c) The connection switches are disabled when the sensed current of the respective battery is less than or equal to a minimum charging current for a predetermined amount of time.

10) A soft-start procedure, which increases the SMPS output voltage reference Vout_ref (linearly in a controlled manner to the OVR setpoint defined by the battery charging algorithm). The soft-start will pause temporarily at occasions when the connect switches are enabled (so as to allow for delays in the control logic, and the analog switching delays.

11) A charge algorithm capable of appropriately varying the OVR and BCR regulation setpoints Vout_ref and Imax, so as to charge a given battery chemistry. The algorithm can use the sensed voltage, current, and temperature of the battery, depending on the manufacturer's recommended charging profile.

EXAMPLES

Disclosed embodiments are further illustrated by the following specific Examples, which should not be construed as limiting the scope or content of this Disclosure in any way.

Figure 6:
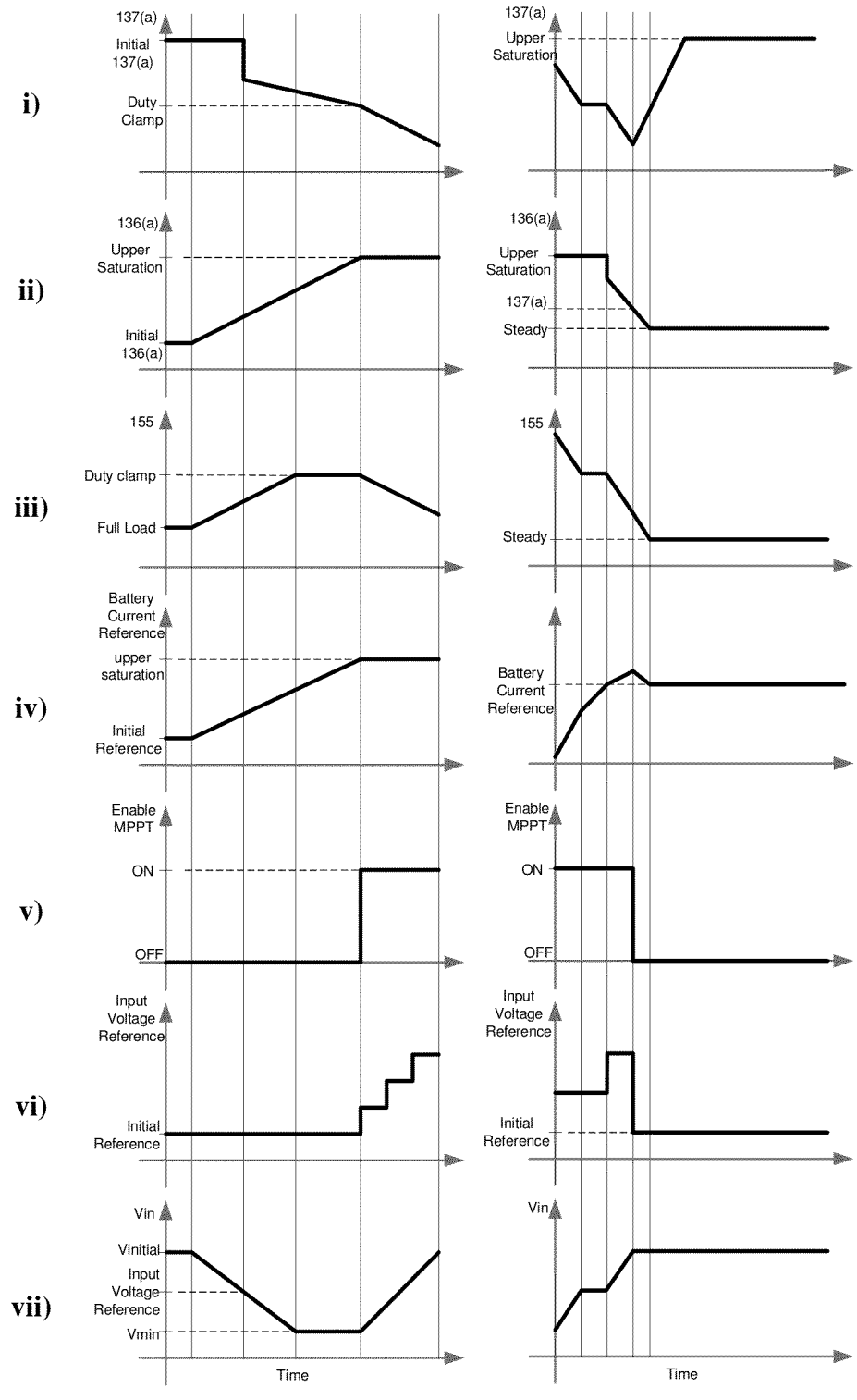
FIGS. 6A and B provides some example performance data for an example battery charger according to a disclosed embodiment for battery current mode regulation (shown as BCR>MPPT) mode as well as for MPPT mode operation (shown as MPPT>BCR) mode, respectively, shown for selected parameters.

FIGS. 6A and 6B provides some example performance data for an example battery charger according to a disclosed embodiment. FIG. 6A shows example selected operational parameters i) to vii) for battery current mode regulation mode (shown as BCR>MPPT), while FIG. 6B shows example operational parameters i) to vii) for MPPT regulation mode operation (shown as MPPT>BCR). In the transition from BCR to MPPT operation with a photovoltaic power source, the input voltage will tend to collapse, until the duty cycle clamp occurs, at which point the input voltage will cease to fall, and the BCR will reach the upper saturation point. Once the BCR saturation point has been reached, the MPPT function will be enabled. The transition from MPPT to BCR with a photovoltaic power source would indicate that there is too much power available based on the maximum battery current. Once the battery current reference is exceeded, the BCR will come out of upper saturation, and fall until the BCR begins controlling the duty cycle, limiting the current, and disabling MPPT.

Figure 7:
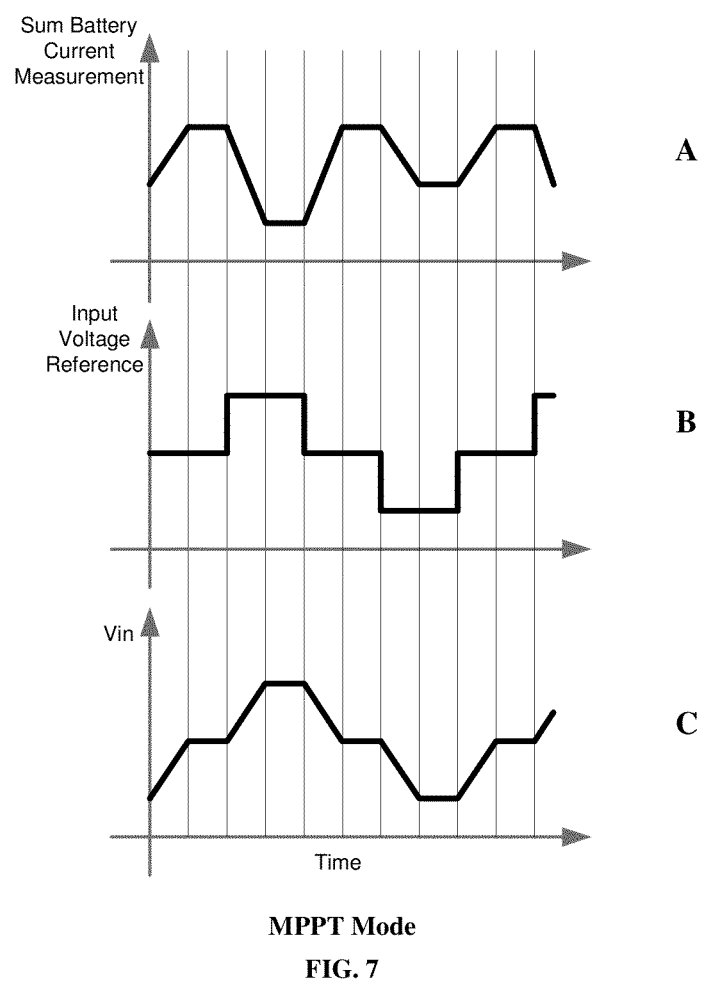
FIGS. 7A-C provides some performance data for an example battery charger according to a disclosed embodiment.

FIGS. 7A-C provides some example performance data during MPPT mode operation for the parameters sum battery current measurement (A), the input voltage reference (B), and Vin (C), for an example battery charger according to a disclosed embodiment. The MPPT mode operation shown is for a time duration longer as compared to that shown for MPPT mode operation in FIG. 6B.

While various embodiments of the invention have been described above, it should be understood that they have been presented by way of example only, and not limitation. Numerous changes to the disclosed embodiments can be made in accordance with the disclosure herein without departing from the spirit or scope of the disclosed embodiments. Thus, the breadth and scope of embodiments of the invention should not be limited by any of the above explicitly described embodiments. Rather, the scope of the invention should be defined in accordance with the following claims and their equivalents.

Although the embodiments of invention have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting to embodiments of the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A controller block for a battery charger including a power converter, comprising:
   a plurality of parametric sensors for providing a plurality of sensed parameters provided by said power converter while said power converter is connected between a power source and at least one battery for charging said battery, said sensed parameters including a sensed Vin signal, a sensed Vout signal and a sensed Iout signal;
   a battery current regulator (BCR) coupled to receive said sensed Iout signal and an Iout reference, said BCR outputting a first duty cycle control signal;
   an input voltage regulator (IVR) for receiving said sensed Vin signal and a Vin reference, said IVR providing a second duty cycle control signal;
   a processor coupled to receive said sensed Iout signal, said processor utilizing a Maximum Power Point Tracking (MPPT) algorithm for providing said Vin reference to said IVR, and
   a selection block coupled to receive said first and said second duty cycle control signals, said selection block forwarding one of said first and said second duty cycle control signals as a duty cycle control signal to said power converter.

2. The controller block of claim 1, wherein said first and said second duty cycle control signals implement both battery current regulation and said MPPT, respectively.

3. The controller block of claim 1, further comprising an output voltage regulator (OVR) coupled to receive said Vout for generating said Iout reference, wherein an output of said OVR is coupled to provide said Iout reference to said BCR to implement charge control for said battery.

4. A battery charger, comprising:
a power converter coupled to receive an input voltage (Vin) from a power source and provide an output voltage (Vout) and a battery charging current (Iout) to charge one or more batteries;
a controller block having an output that provides a duty cycle control signal for said power converter coupled to a control input of said power converter, said controller block comprising:
a plurality of parametric sensors for providing a plurality of sensed parameters including a sensed Vin signal, a sensed Vout signal and a sensed Iout signal;
a battery current regulator (BCR) coupled to receive said sensed Iout signal and an Iout reference, said BCR outputting a first duty cycle control signal;
an input voltage regulator (IVR) for receiving said sensed Vin signal and a Vin reference, said IVR providing a second duty cycle control signal;
a processor coupled to receive said sensed Iout signal, said processor utilizing a Maximum Power Point Tracking (MPPT) algorithm for providing said Vin reference to said IVR, and
a selection block coupled to receive said first and said second duty cycle control signals, said selection block forwarding one of said first and said second duty cycle control signals as said duty cycle control signal to said power converter.

5. The battery charger of claim 4, wherein said plurality of parametric sensors are exclusive of an input current sensor.

6. The battery charger of claim 4, wherein said selection block implements a minimum function to select a lower in magnitude of said first and said second duty cycle control signals.

7. The battery charger of claim 4, wherein said first and said second duty cycle control signals implement both battery current regulation and said MPPT, respectively.

8. The battery charger of claim 4, wherein said power converter comprises a Pulse Width Modulation (PWM) controlled DC-DC converter.

9. The battery charger of claim 4, further comprising an output voltage regulator (OVR) coupled to receive said Vout for generating said Iout reference, wherein an output of said OVR is coupled to provide said Iout reference to said BCR to implement charge control for said battery.

10. A method of charging batteries using a battery charger that includes a switched power converter disposed between a power source and a battery that provides input power at an input voltage (Vin), said power converter generating an output voltage (Vout) and a battery current (Iout), comprising:
sensing parameters using a plurality of parametric sensors including a sensed Vin signal, a sensed Vout signal and a sensed Iout signal;
generating a first duty cycle control signal from said sensed Iout signal and an Iout reference;
generating a second duty cycle control signal from said sensed Vin signal and a Vin reference;
selecting between said first and said second duty cycle control signals, and
forwarding one of said first and said second duty cycle control signals as a duty cycle control signal to said power converter.

11. The method of claim 10, further comprising a soft-start procedure which increases a battery voltage reference linearly to a battery charge voltage defined by a battery charging algorithm that modifies said Iout reference, including a temporary pause of said soft-start procedure while said battery is connected to allow charging, so as to allow for control logic and analog switching delays.

12. The method of claim 10, wherein said selecting implements a minimum function to select a lower in magnitude of said first and said second duty cycle control signals.

13. The method of claim 10, wherein said first and said second duty cycle control signals implement battery current regulation and said MPPT, respectively.

14. The method of claim 10, wherein said switched power converter comprises a battery current regulator (BCR) coupled to receive said sensed Iout signal and said Iout reference, said BCR outputting said first duty cycle control signal and an input voltage regulator (IVR) for receiving said sensed Vin signal and said Vin reference, said IVR providing said second duty cycle control signal, and a selection block for said selecting between said first and said second duty cycle control signals;
said method further comprising adjusting an output of said BCR and said IVR to equal a current duty cycle being commanded by said selection block at a time one of said BCR and IVR is transitioning from a saturated state to an active state while the other of said BCR and said IVR is selected by said selection block.

15. The method of claim 14, further comprising regulating a maximum output voltage of said battery with an Output Voltage Regulator (OVR), wherein said OVR is coupled to a voltage sense of said battery to define an upper saturation limit of said BCR to limit said maximum output voltage of said battery.

16. The method of claim 14, further comprising implementing a Temperature Current Limiter (TCL) function that commands a Maximum Charge Current (MCC) of said battery charger as commanded to said BCR to define a linear reduction in current as a sensed temperature of said battery charger lies beyond the pre-determined safe operating temperature of said battery charger.

17. The method of claim 14, further comprising preventing a collapse of said Vin during transitions between operation of said IVR and BCR, comprising:
a Minimum Input Equation (MIE) which calculates a minimum input voltage (MIV) needed to operate said power converter, and
a Minimum Input Voltage (MIV) function which clamps said Vin to a minimum input voltage set by said MIE by preventing said duty cycle selected by said selecting from increasing whenever said sensed Vin signal is equal to or less than said MIV.

18. The method of claim 17, further comprising implementing a Maximum Power Point Tracking (MPPT) algorithm that modifies said Vin reference so as to maximize said Iout, said MPPT having an enable and a disable state, wherein:
said disabled state resets said Vin reference to a minimum operational input voltage as commanded by said MIE; and
said enabled state actively varies said Vin reference to achieve a maximum charging current by monitoring said Iout, and varying said Vin reference to increase captured energy from said power source.

19. The method of claim 15, further comprising sensing a battery voltage, and a battery current of said battery, and changing regulation setpoints for said OVR and said BCR based on at least one of said battery voltage and said battery current.

20. The method of claim 19, further comprising sensing a temperature of said battery, and changing regulation setpoints for said OVR and said BCR based on said temperature.

* * * * *